United States Patent [19]
Shin

[11] Patent Number: 6,081,395
[45] Date of Patent: *Jun. 27, 2000

[54] APPARATUS AND METHOD FOR GENERATING A DIGITAL TRACKING SIGNAL WITH A FREQUENCY SPECTRUM CORRESPONDING TO ONE OR MORE N-BIT WORDS

[75] Inventor: Hyun Chul Shin, Seoul, Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/688,970

[22] Filed: Jul. 31, 1996

[30] Foreign Application Priority Data

May 18, 1996 [KR] Rep. of Korea .................. 96-16787

[51] Int. Cl.⁷ .................. G11B 5/09; G11B 20/14; G11B 5/584

[52] U.S. Cl. .................. 360/40; 360/41; 360/77.14

[58] Field of Search .................. 360/77.14, 40, 360/41; 341/58

[56] References Cited

U.S. PATENT DOCUMENTS

| | | | |
|---|---|---|---|
| 5,142,421 | 8/1992 | Kahlman et al. | 360/40 |
| 5,579,182 | 11/1996 | Hamai et al. | 360/41 |
| 5,642,241 | 6/1997 | Kim | 360/41 |
| 5,659,577 | 8/1997 | Ohishi | 360/40 |
| 5,671,101 | 9/1997 | Senshu et al. | 360/77.14 |

*Primary Examiner*—Glenton B. Burgess
*Assistant Examiner*—Regina Y. Neal
*Attorney, Agent, or Firm*—Finnegan, Henderson, Farabow, Garrett & Dunner, L.L.P.

[57] ABSTRACT

A signal recording apparatus for a video instrument using a magnetic recording medium which is capable of more accurately computing the signal to be recorded on the tape by correcting the output signal when affixing "1" or "0" after computing the output signal to which the pilot tone is affixed. In addition, one line block is used on the assumption that "1" or "0" is always affixed to the code word.

20 Claims, 12 Drawing Sheets

FIG. 5
CONVENTIONAL ART

| REGISTER X1 X2 | ('0' AFFIXING) INPUT DATA BIT STREAM | DISPARITY |
|---|---|---|
| 0  0 | (0)0 1 1 0 0 0 1 0 1 1 1 0 1 0 1 1 0 0 0 1  1 1 0 1 | |
| 0  1 | 0 0 1 1 1 1 0 1 1 0 1 1 1 0 0 0 1 0 0 0 0 1 1 0 0 0 1 | +1 |
| 1  0 | 0 1 1 0 1 0 1 1 1 0 0 0 1 0 0 1 0 0 1 0 1 0 0 1 1 0 1 1 | +1 |
| 1  1 | 1 0 0 1 0 1 0 0 0 1 1 1 0 1 1 0 1 1 0 1 1 0 0 1 0 0 | −1 |
|  | 1 1 0 0 0 0 0 1 0 0 1 0 0 0 1 1 1 1 0 0 1 1 1 0 | −1 |

| REGISTER X1 X2 | ('1' AFFIXING) INPUT DATA BIT STREAM | DISPARITY |
|---|---|---|
| 0  0 | (1)0 1 1 0 0 0 1 0 1 1 1 0 1 1 0 1 1 0 0 0 1  1 1 0 1 | |
| 0  1 | 1 0 0 1 0 1 0 0 0 1 1 1 0 1 1 0 1 1 0 0 1 0 0 | +1 |
| 1  0 | 1 1 0 0 0 0 0 1 0 0 1 0 0 0 1 1 1 1 0 0 1 1 1 0 | +1 |
| 1  1 | 0 0 1 1 1 1 0 1 1 0 1 1 1 0 0 0 1 0 0 0 0 1 1 0 0 0 1 | −1 |
|  | 0 1 1 0 1 0 1 1 1 0 0 0 1 0 0 1 0 0 1 0 1 0 0 1 1 0 1 1 | −1 |

| INITIAL VALUE | $J^{n-1}_{23}$, $J^{n-1}_{24}$ | | | |
|---|---|---|---|---|
| | $R_1 R_2$ | $R_1 \overline{R_2}$ | $\overline{R_1} R_2$ | $\overline{R_1}\,\overline{R_2}$ |
| sync 0 | $R_1 R_2$ | d.c | d.c | d.c |
| sync 1 | $\overline{R_1}\,\overline{R_2}$ | d.c | d.c | d.c |
| non-sync 0 | $R_1 R_2$ | $\overline{R_1} R_2$ | $R_1 \overline{R_2}$ | $\overline{R_1}\,\overline{R_2}$ |
| non-sync 1 | $R_1 \overline{R_2}$ | $\overline{R_1}\,\overline{R_2}$ | $R_1 R_2$ | $\overline{R_1} R_2$ |

* d.c = don't care

FIG. 14

| CODE WORD | | CASE 1 (sync) | CASE 2 (next to sync) | CASE 3 (rest) |
|---|---|---|---|---|
| AFFIXING BIT WITHIN 4 BLOCKS | | 00 11 (xx xx) | 0 1 (0 1) | 0 1 (0 1) |
| RESISTER VALUE | INITIAL VALUE | 00 00 (xx xx) | ab ab (ab ab) | cd cd (cd cd) |
| | AFTER COMPUTATION | ab ab (ab ab) | cd cd (cd cd) | ef ef (ef ef) |
| | AFTER ALLOCATION | ab ab (ab ab) | cd cd (cd cd) | ef ef (ef ef) |
| IF NECESSARY, AMEND THE REGISTER VALUE | | INVALID | $B_3 \leftarrow (R_{11} R_{21})$ $B_4 \leftarrow (R_{12} R_{22})$ | $B_3 \leftarrow (R_{12} R_{22})$ $B_4 \leftarrow (R_{11} R_{21})$ |

# APPARATUS AND METHOD FOR GENERATING A DIGITAL TRACKING SIGNAL WITH A FREQUENCY SPECTRUM CORRESPONDING TO ONE OR MORE N-BIT WORDS

BACKGROUND OF THE INVENTION

1. Field of the Invention

The present invention relates to a signal recording apparatus for a video device using a magnetic recording medium, and particularly to an improved video device using a magnetic recording medium capable of generating a pilot tone for automatic tracking and accurate positioning of a recording/reproducing head on a magnetic recording track during recording of a digital video signal on a magnetic recording medium such as a magnetic tape.

2. Description of the Conventional Art

Generally, a circuit for recording digital information on a magnetic recording medium converts a video or audio signal from a signal source into a standardized digital format. This conversion process involves performing error correction and coding, and processing the signal to a recording signal format using a recording unit and coding unit.

As mentioned above, when recording digital information (either a digital audio or video data) on a magnetic recording medium, a track following circuit has been generally used as a recording apparatus.

The track following circuit uses a time multiplexing method for completely separating the data signal and the servo signal system within the track, and a frequency multiplexing method for separately recording the data and the servo position information, such as a pilot tracking tone, on separate frequency regions.

FIG. 1 shows the track arrangement on a tape for one picture. A digital signal is on the track recorded in accordance with the frequency multiplexing method. In particular, the input data is recorded on tracks F0, F1, F2, F0, F1, . . . , while the head runs angularly over the tracks of the tape from the lower to the upper portion of each track. As further shown in FIG. 1, one picture consists of ten tracks.

Reading of recorded data by the head will now be described.

Assuming that pilot tone frequency on the (2n)th track is referred to "f1", and the pilot tone frequency of the (2n+1)th is referred to "f2", different than f1, f1 and f2 can be separated using a band-pass filter. Thus, it is possible to accurately follow the track from the size of the servo position information f1 and f2. Namely, when the head deviates from its corresponding track, since the amount of one frequency component is increased, and the amount of another frequency component is decreased, it is possible to detect the amount of movement of the head position by computing the difference of the magnitude of the pilot tone between neighboring tracks.

In order to accurately position the head, the power spectrum of the encoded data bit stream should be decreased near the pilot tone frequency, and then the data should be encoded.

Referring to FIG. 1, each track of the tape is classified into F0, F1, F2 in accordance with the frequency characteristic.

In the track F0, the pilot tone does not exist in the frequencies f0 and f1. In track F1, the pilot tone does not exist in the frequency f1, and in track F2, the pilot tone does not exist in frequency f2.

As shown in greater detail in FIG. 2, the frequency of the F0 track has a notch in order for the energy of the frequency of f1 and f2 to be lower than the normal level by less than 9 dB. Preferably, the pilot tone should be lower than a range between 16 dB and 19 dB.

These pilot tones are referred to as tracking signals so as to accurately read the position of the recorded data, and are recorded on the magnetic recording medium together with other digital information such as video and audio data.

The pilot tones and digital information are recorded in accordance with an international standard reference. In particular, as shown in FIG. 1, one track is composed of four sectors such as an ITI (Insert and Track Information), a video data, an audio data, and a sub-code. Since a gap exists between these four sectors, the data is recorded thereon without overlapping data of another region. In addition, the data within a predetermined track is added by an error correction code, and is then scrambled and divided into a plurality of bits by 24 bits. One bit is added to the top thereof at every 24 bits for coding, and the total recording ratio is about 42 Mbps.

This is called as 24–25 modulation. The entire 25 bits is referred to as one code word, and the code word selected in accordance with the following two limitative conditions is recorded on the tape:

Condition 1 (Priority 1): The "run lenth" of consecutive "0" or "1" bits should be less than 10. If the maximum bit run length (of number of bits) becomes greater than 9 by adding one bit ("0" or "1"), an additional one bit is selected to shorten the maximum bit run length of the code word.

Condition 2 (Priority 2): When the modulated sequence satisfies the above Condition 1 (priority 1), one bit is selected to make the frequency characteristic of the modulated sequence close to the frequency characteristic shown in FIG. 2 for each track.

FIG. 3 shows a conventional circuit for generating the pilot tone by affixing one bit at the top of every 24 bits from the input bit stream during the recording and coding process. By adding this one bit, the tracking pilot tone is included in the data.

The pilot signal is used as a control signal when the video head runs on the track to reproduce or play-back the information recorded on the magnetic tape. That is, it is possible to periodically vary the digital sum value (DSV) of the number of "0" or "1" bits contained in the input data having a predetermined length by controlling the added bit to "0" or "1", and is possible to generate the signals having the aforementioned two kinds of pilot tone signal frequencies f1 and f2. Three tracks of F0, F1, F2 of FIG. 1 are made by varying the pilot tone signal at every track. The frequency spectrum of each track is shown in FIG. 2.

The circuit of FIG. 3 in which the data is recorded with the pilot tone includes an affixing portion for affixing one bit signal so as to obtain (n+1) bits of information, a 2T precoder for generating a code word, and a predetermined portion for generating a control signal.

As further shown in FIG. 3, the conventional signal recording apparatus includes a parallel/serial converter 301 for converting 8 bit parallel input data into a serial data stream of 24 bits. A signal affixing block 302 receives the output of the parallel/serial converter 301 and sets one bit to a "0". A signal affixing unit 303 receives the output of the parallel/serial converter 301 and sets one bit to a "1". A 2T precoder 304 receives the output of the signal affixing unit 302 and generates the 25 bit code word. A 2T precoder 305 receives the output of the signal affixing unit 303 and outputs the 25 bit code word. Control signal generator 306 receives the output of the precoders 304 and 305, detects the frequency characteristic of each bit stream (a 25 bits code word), and generates the control signal so that the bit stream nearest the frequency characteristic of the track to be recorded among two bit streams to be selected.

As further shown in FIG. 3, a Tmax detector 307 detects the upper limitative value (for example, 10) of the bit length of the signal affixing unit 304. Tmax detector 307 also supplies the signal to the control signal generator 306. Another Tmax detector 308 detects the upper limitative value of the bit length of the signal affixing unit 305 and outputs in response thereto the detected value to the control signal generator 306. A decision block 309 receives the output of the control signal generator 306 and the output of the Tmax detectors 307 and 308 and selects, as well as controls, the code word to be recorded. A head/switching unit 310, receiving the control output of the recording signal decision unit 309, selects one code word of the 2T precoder 304 and one code word of the 2T precoder 305 in accordance with the control output of the recording signal decision unit 309. The code words are then recorded.

In this conventional signal recording unit, the bit run length (the number of the continuous "0" or "1") is limited to below 9. Under this condition, an "AT"-precoder having a condition of "a≧2" is better than a "1T"-precoder, and when selecting "n" (the number of bits of the input unit)<10, efficiency is improved.

The circuit of FIG. 3 is the hardware for recording n-bit information, and the signal recording operation with respect to each block is performed as follows.

Parallel video data of 8 bits is input to the parallel/serial converter 301. The parallel/serial converter 301, in turn, converts three groups of parallel data of input 8 bits into the bit stream of 24 bits serial data, and, therefore, 24 bits of converted data are input to "0" signal affixing unit 302 and "1" signal affixing unit 303.

The "0" signal affixing unit 302 affixes "0" one bit at the top of every 24 bits of the input 24 bits stream for the previously described 24-25 modulation. In addition, the "1" signal affixing unit 303 affixes a "1" to one bit at the top bit of 24 bits of the input bit 24 stream for the 24–25 modulation.

Through the above-mentioned process, a channel word of 25 bits is obtained by the signal affixing units 302 and 303.

The channel word of 25 bits is input to the 2T precoders 304 and 305, respectively, which converts the channel word of 25 bits into a code word of 25 bits. FIG. 4 shows the construction of one of precoders 304 and 305.

The precoder includes an exclusive OR gate (XOR) 401 and two register R1, 402 and R2 403. Channel word data and the value of R1 register 402 having a predetermined characteristic delayed by a clock cycle T of an input signal are input to exclusive OR gate 401 to generate output data. This output is supplied to the R2 register 402 in order for it to be input to the exclusive OR gate 401.

When converting two 25 bits channel words to which "0" or "1" are affixed into a code word, R values stored in registers R and R2, X1 and X2, respectively, should be assigned to the register value of the 2T precoder, which outputs the code word that is recorded/selected among the previous code words. Thus, it maintains the interdependency between the code words after synchronization so that it is possible to return to the original signal.

Two registers 402 and 403 are used for the above-mentioned reason, and each output is input to the 2T precoder, and the output from another precoder is input to the registers 402 and 403.

FIG. 5 shows the embodiment of the input/output relationship of the 2T precoder of FIG. 4.

The data converted into the code word by the 2T precoder is input to the control signal generator 306, the Tmax detectors 307 and 308, and the delay units 312 and 313, in that order, as shown in FIG. 3. The delay circuit stores the code word until a control signal is generated by the control signal generator. The control signal generator 306 detects the frequency characteristic of the 25 bit input code word bits. In response, control signal generator 306 generates a control signal so that the code word nearest the frequency characteristic of the track to be recorded among two code words can be selected.

The Tmax detectors 307 and 308 detect the bit run length of the code word. When the bit run length of the code word exceeds 10, a detection signal (i.e., a control signal) is input to the control signal generator 306. For example, if it is assumed that a control signal is generated by hoax detector 307, the control signal of the Tmax detector 307 is input, by priority, to the recording signal decision unit 309 to affect the control signal thereof, but does not affect the control signal of the control signal generator 306.

Due to the above-mentioned matter, the recording signal decision unit 309 outputs a control signal in order for a code word having a shorter bit run length to be selected, and the head/switching unit 310 selects the code word of the 2T precoder 305 and records it on magnetic tape 311. In fact, the code word of the 2T precoder 305 stored in the delay unit 313 is selected and recorded.

The other Tmax detector 308 has the same operation as described above. Namely, when the Tmax detector 308 detects a bit run length longer than 10, the recording signal decision unit 309 blocks the control signal of the control signal generator 306 and selects the code word of the delay unit 312, which stores the output of the 2T precoder 304 and records it on the magnetic tape.

FIG. 6 shows one example of the control signal generator 306 which receives the code word data input from one of the 2T precoders. The code word data is then integrated by the adder 601 and the memory 602. The resulting integrated value is subtracted by the desired DSV f1 626 and the subtractor 603, and input to the summing unit 605 through the squaring unit 604.

The code word data input from one of the 2T precoder is also multiplied by sine wave signal sin w2 by the multiplier 606 and is then subject to band-pass-filtering. The result is integrated by the adder 607 and the memory 608. The value of this integration is input to the summing unit 605 through squaring unit 609.

The code word data input from one of the 2T precoder is multiplied by a cosine signal cos w2 by the multiplier 610, and is then subject to band-pass-filtering. It is then integrated by the adder 611 and the memory 612. The result of this integration is input to the summing unit 605 through the multiplier 613.

The code word data input from another 2T precoder is integrated by the adder 614 and the memory 615, and the resulting integrated value is subtracted by the desired DSV f1 626 and the subtractor 616.

The code word data input from another 2T precoder is multiplied by the sine wave signal sin w2 with multiplier 619, and then band-pass-filtered. It is then integrated by the adder 620 and the memory 621, and the result is input to the summing unit 618 through the squaring unit 617.

The code word data input from another 2T precoder is also multiplied by the sine wave signal sin w2 with multiplier 619 and is then band-pass-filtered. It is then integrated by the adder 620 and the memory 621, and the result is input to the summing unit 618 through the multiplier 622.

The code word data input from another 2T precoder is further multiplied by a cosine wave signal cos w2 by the multiplier 623 and is band-pass-filtered. It is then integrated by the adder 624 and the memory 625, and the result is input to the summing unit 618 through the multiplier 626.

The comparing unit 627 outputs a control signal CS in order for the code word to output the lowest value among the outputs of two summing units 605 and 618. Control signal CS is used for setting two register values of the 2T precoder and the value of the integrating unit of the control signal generator for every 25 bits. In this way, the pilot tone is generated at frequency f1, and the notch is made at frequency f2 and a DC frequency.

FIG. 7 shows a circuit diagram showing another embodiment of the conventional control signal generator 306, which uses a filtering circuit and generates a pilot tone using the square wave as a pilot tone.

This circuit has a predetermined element for processing the signal input from one of the 2T precoders of FIG. 3. The circuit includes a subtractor 701 for subtracting the input code word and the square wave f1 702. A multiplier 703 is also included for multiplying the output of the subtractor 701 by the sine wave sin w1. An additional multiplier 704 multiplies the output of the subtractor 701 by the cosine wave cos w1. A further multiplier 705 multiplies the output of the subtractor 701 by the sine wave sin w2.

Multiplier 706 multiplies the output of the subtractor 701 by a cosine wave cos w2, and an integrating unit 707 integrates the output of the subtractor 701. Also, integrating units 708 through 711 integrate the outputs of the multipliers 703 through 706, respectively, and squaring units 712 through 716 square the outputs of the integrating units. A summing unit 717 sums the outputs of the multipliers and outputs a control signal.

The control signal generator generates a pilot tone using the square wave signal as the pilot tone. It also subtracts the reference value by using the subtractor 701 before the code word is input from the control signal generator, and uses the pilot tone having the size "A" as a pilot tone. The code word value passed through the 2T precoder is subtracted as much as the reference value of the square wave signal and is input to the DC-free blocks 707 and 712, the f1 generating clocks 703, 704, 708, 709, 713, and 714, the f2 generating blocks 705, 706, 710, 715, and 716 and processed by each clock. The power is then computed by summing unit 717.

The conventional digital information recording apparatus as shown in FIGS. 3 through 7 has disadvantages in recording the data in real time. Namely, since the delay time is lengthy during the processing to select data to be recorded, it is difficult to process data in real time. For real time processing, four line blocks are required, causing the circuit to become complicated.

In addition, the register of the 2T precoder should be set with accurate values before a new code word is input to the 2T precoder, and this set value is decided in accordance with the control signal CS generated by the previous code word.

The last bit of the previous code word should pass through within 23nsec in order for the first bit of the code word of 25 bits to be input to the 2T precoder. However, it is difficult to obtain this speed using the commonly used operator, because it is very difficult to complete one data computation within one clock time (23 nsec) from the output of the 2T precoder to the output of the control block.

The path referring to the maximum delay time during the above-mentioned signal transfer process is to pass through the subtractor, the multiplexor, the integrating unit, the multiplier, the adder, the comparing unit, and the like. An effective method for resolving the above-mentioned problems is to expand the line block to four as shown in FIGS. 2 through 7, to arrange all possible situations, and to select a more accurate line block at every code word.

However, with the above-mentioned method, the amount of hardware required is disadvantageously increased.

SUMMARY OF THE INVENTION

Accordingly, it is an object of the present invention to provide an improved signal recording apparatus for a video device using a magnetic recording medium which overcomes the problems encountered in the conventional signal recording apparatus for a video device.

It is another object of the present invention to provide a signal recording apparatus for a video device using a magnetic recording medium which is capable of more accurately computing the signal to be recorded on the tape by correcting the output signal when affixing "1" or "0" after computing the output signal to which the pilot tone is affixed. In addition, one line block is used on the assumption that "0" or "1" is always affixed to the code word.

It is another object of the present invention to provide a signal recording apparatus for a video device using a magnetic recording medium which is capable of reducing the number of line blocks needed when processing the data in real time from 4 to 2. The processing uses a regular characteristic of the bit data output from the precoder and sharing the squaring block. Such sharing of the squaring block plays an important role in deciding the size of the circuit, and reducing the number of squaring blocks to one, which is also used for the error signal computation.

It is another object of the present invention to provide a signal recording apparatus for a video device using a magnetic recording medium which is capable of processing the digital information in real time and achieving a more simple construction of the circuit.

It is further an object of the present invention to provide a signal recording apparatus for a video device using a magnetic recording medium which is capable of generating a pilot tone using a sub-integrating unit in front of the main integrating unit. In addition, the computation of the reference square wave form is conducted by a predetermined table, thus simplifying the real time data processing and circuit construction.

To achieve the above objects, and in accordance with one aspect of the present invention, there is provided a device for generating a digital tracking signal having a frequency spectrum corresponding to one or more n-bit information words. The device comprises means for affixing an m-bit digital word of a predetermined value to each of the n-bit information words to generate (n+m)-bit channel words; an aT precoder, "a" being an integer value greater than equal to two and "T" being the bit period associated with the (n+m)-bit channel word, for encoding a respective one of the (n+m) channel words to generate an (n+m) code word; a control signal generator, coupled to the aT precoder, for determining whether the frequency spectrum associated with the (n+m) code word has a desired pattern to generate a control signal base on the result of the determination; and a correction device, coupled to the aT precoder, for modifying the (n+m) code word to generate a tracking signal having a desired frequency spectrum in response to the control signal.

To achieve the above objects, in accordance with another aspect of the present invention, there is provided a device for generating a digital tracking signal having a frequency spectrum corresponding to one or more n-bit information words which comprises first means for affixing an m-bit digital word of a first value to an n-bit information word to generate a first (n+m)-bit word; second means for affixing an m-bit digital word of a second value different than the first value to an n-bit information word to generate a second (n+m)-bit channel word; a first integrator, coupled to the first affixing means, for integrating the first (n+m)-bit channel word to generate a first channel value; a second integrator, coupled to the second affixing means, for integrating the second (n+m)-bit channel word to generate a second channel value; a selector for selecting a channel value between the first and second channel values in response to a control signal; a third integrator, coupled to the selector, for integrating a first selected channel value consecutively to provide a first power value; a fourth integrator, coupled to the selector, for integrating a second selected channel value different than the first selected channel value consecutively to provide a second power; and a controller for generating said control signal in reference to the first and second power values.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a table showing an input/output value of the 2T precoder of FIG. 4;

FIG. 14 is a table showing the values used for correcting a computation value according to the second embodiment of the present invention.

DETAILED DESCRIPTION OF THE INVENTION

Figure 8:
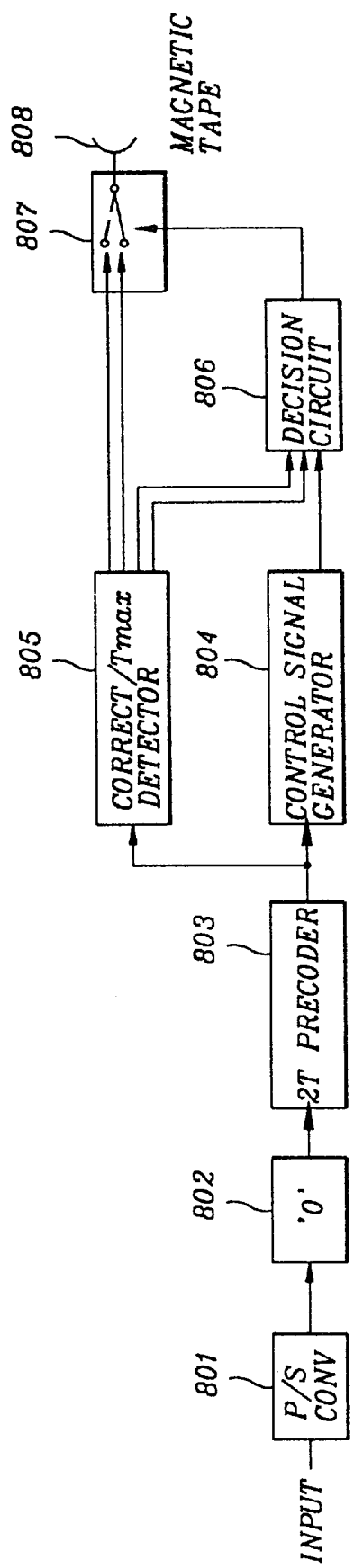
FIG. 8 is a block diagram showing a signal recording apparatus according to a first embodiment of the present invention.

FIG. 8 shows a signal recording apparatus for a video instrument using a magnetic recording medium according to a first embodiment of the present invention. The signal recording apparatus includes a parallel/serial converter 801 for converting parallel input data into a serial data, a signal affixing unit 802 for setting one bit of the output of the parallel serial converter 801 to "0", and a 2T precoder 803 for converting the output of the signal affixing unit 802 to a code word. A control signal generator 804 is also provided for detecting the frequency characteristic that each bit stream has by receiving the output of the 2T precoder 803. In response, control signal generator 804 generates a control signal in order to select the bit stream near the frequency characteristic of the track among two bit streams to be selected. A predetermined data is recorded on the track. A correction/Tmax detector 805 receives the output of the 2T precoder 803, and performs the correction of the "0" affixing code word and "1" affixing code word. This circuit also detects the bit run length, and inputs the control signal in accordance with the bit run length detection to the recording signal decision unit 806. Correction/Tmax detector 805 also inputs the corrected code word to the head/switching unit 807.

A recording signal decision block 806 is also provided for receiving the output of the control signal generator 804 and the output of the correction/Tmax detector 805 and for controlling the selection of the code word to be recorded. In addition, a head/switching unit 807 receives the control of the recording signal decision unit 806, selects one code word among the code words of the correction/Tmax detector 805, and then records on the magnetic tape 808.

Figure 1:
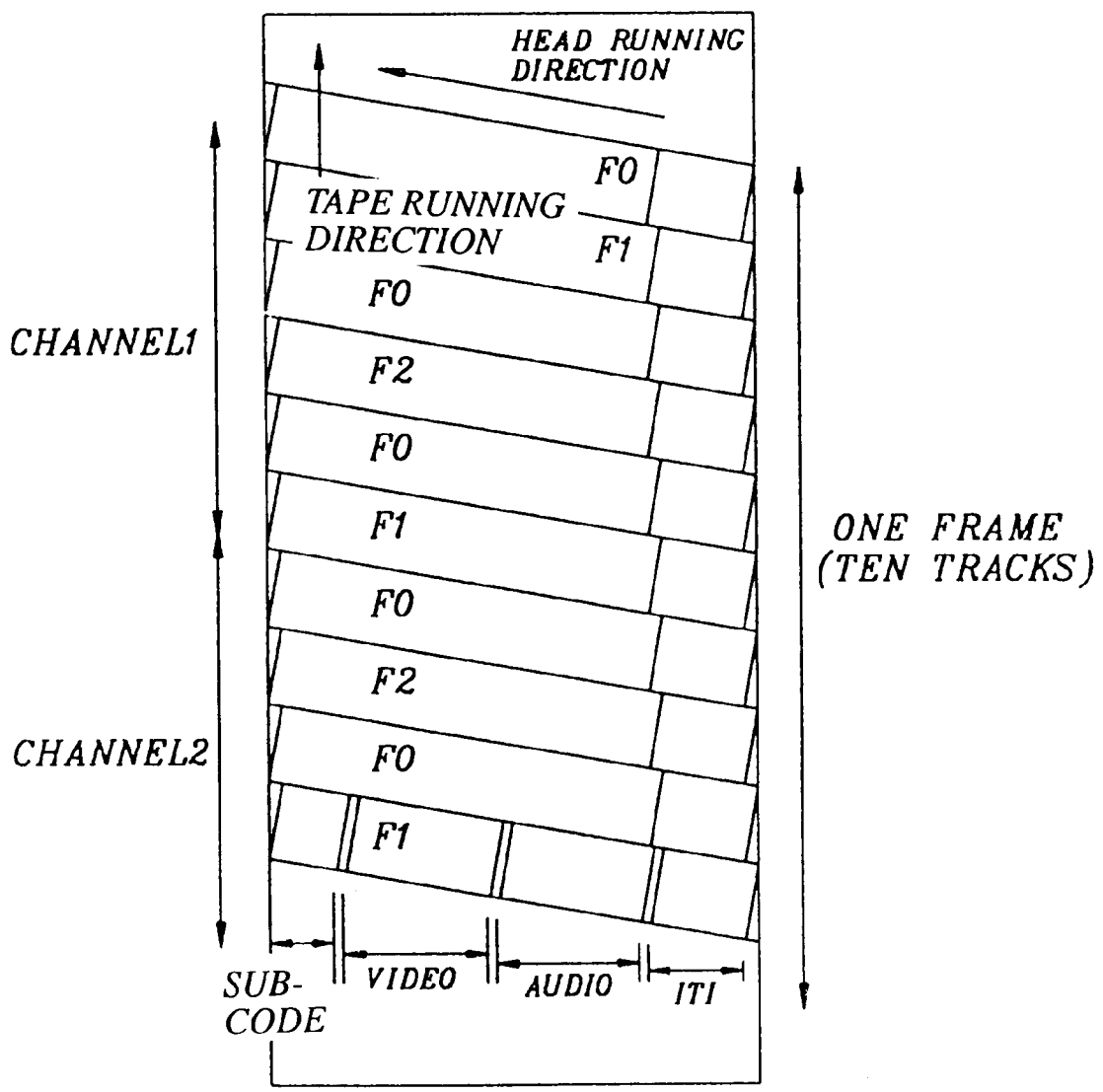
FIG. 1 is a diagram showing the arrangement of a track of one picture of a conventional signal recording apparatus.
Figure 2A:
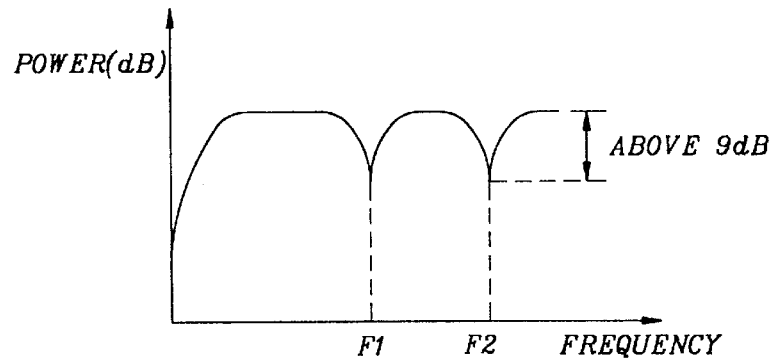
FIG. 2A is a graph showing a frequency characteristic of an F0 track of a conventional signal recording apparatus.
Figure 2B:
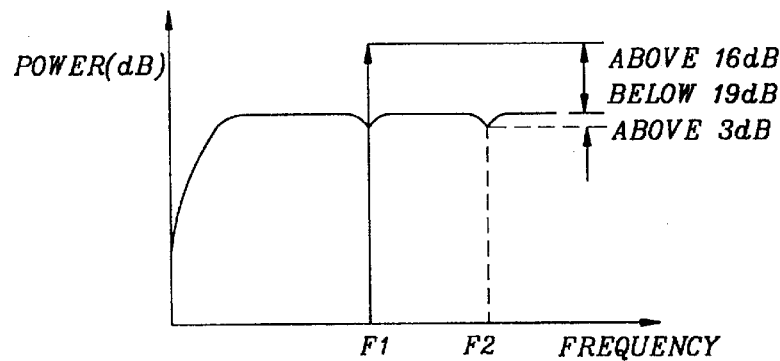
FIG. 2B is a graph showing a frequency characteristic of an F1 track of a conventional signal recording apparatus.
Figure 2C:
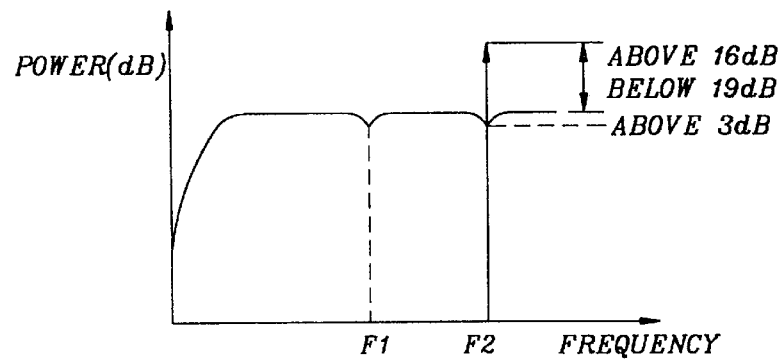
FIG. 2C is a graph showing a frequency characteristic of an F2 track of a conventional signal recording apparatus.
Figure 3:
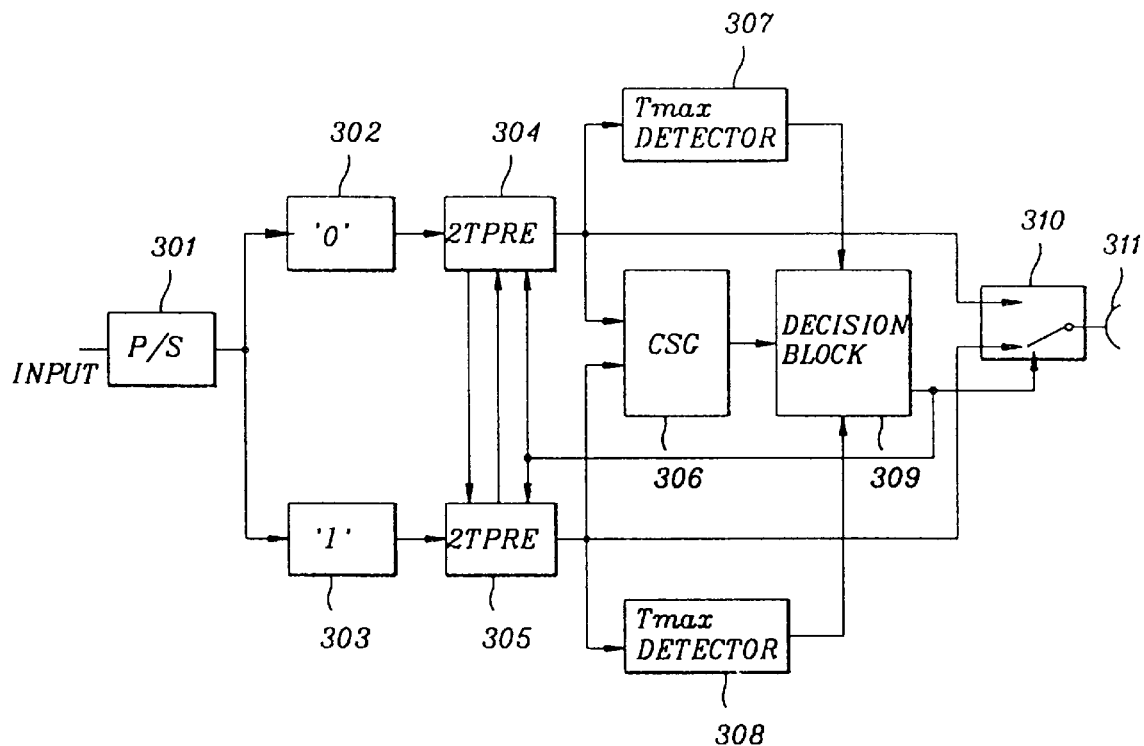
FIG. 3 is a block diagram showing a conventional recording unit having a Tmax detector.

The first embodiment of the present invention uses one block instead of two blocks respectively setting "0" and "1" bits as in the conventional apparatus shown in FIG. 3.

When affixing "1" after computing the output signal to which the pilot tone is affixed on the assumption that the code word "0" or "1" is affixed, the output signal is corrected, and the signal to be recorded on the tape is accurately computed. Namely, a single "0" bit is affixed to the data of 24 bits output from the parallel/serial converter 801 as a default, and the power of the "0" affixing word using the "0" affixing code word and the power of the "1" affixing word are easily computed using the output characteristic of the precoder 803.

The detection of the "1" affixing code word from affixing "0" and the computation of the power of two code words will now be explained in detail.

Figure 4:
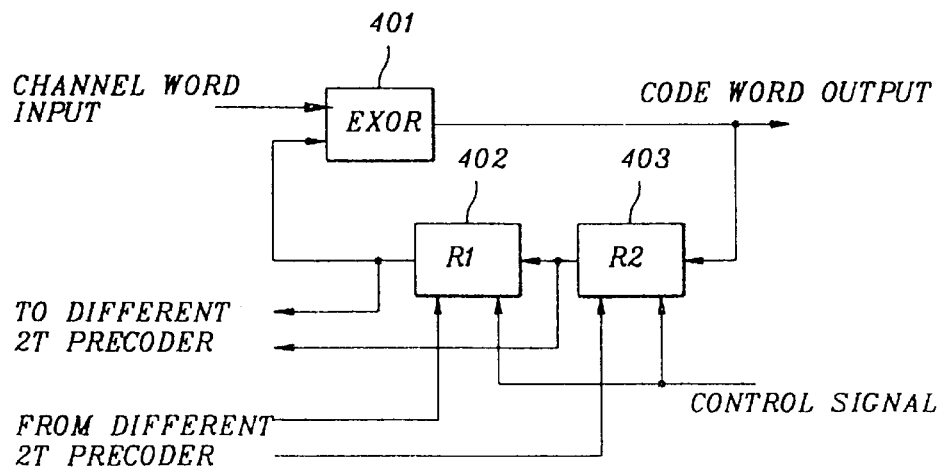
FIG. 4 is a detailed block diagram showing a 2T precoder of FIG. 3.
Figure 6:
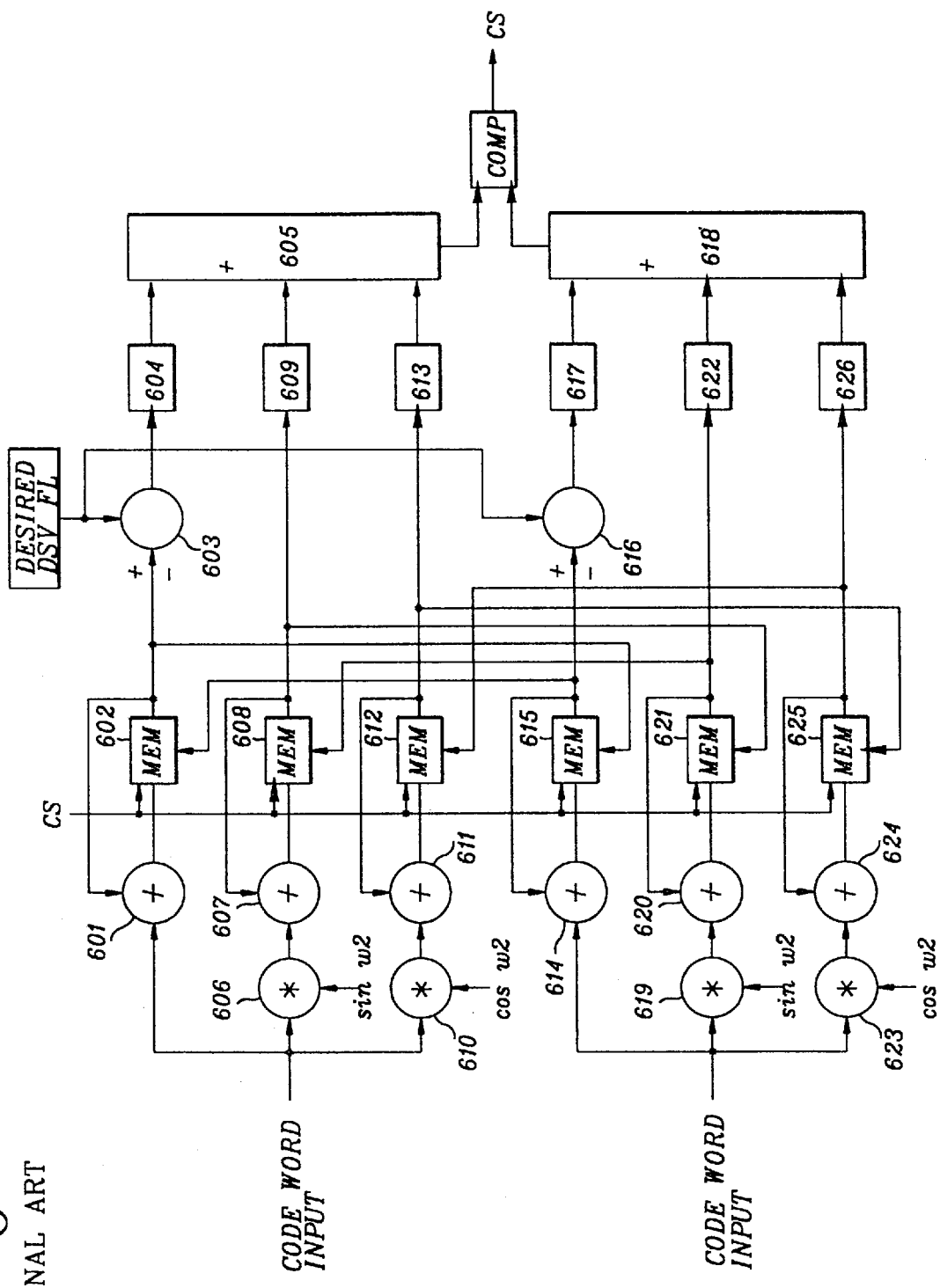
FIG. 6 is a block diagram showing the control signal generator of FIG. 3 in more detail.
Figure 7:
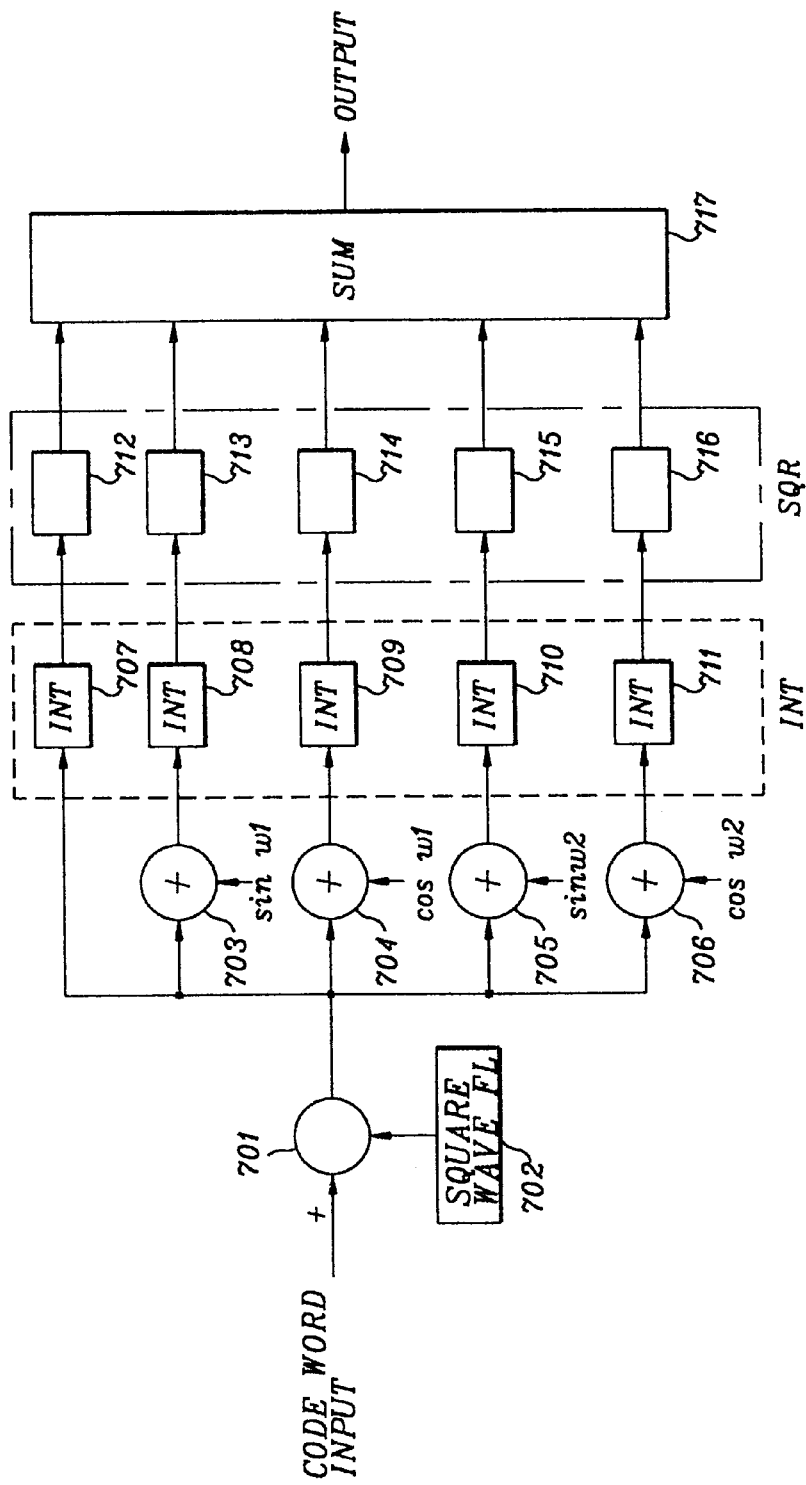
FIG. 7 is a block diagram showing another embodiment of a conventional control signal generator in greater detail.

The channel word of 25 bits to which "0" is affixed by the "0" signal affixing unit 802 is input to the 2T precoder 803 and is converted into a code word of 25 bits. The internal construction of the precoder is composed of the exclusive OR gate and two registers in the same manner as shown in FIG. 4. The code word of 25 bits is output from the precoder 803 to the control signal generator 804 and the correction/Tmax detector 805. The output of the precoder 803 is computed after it is divided into an even output and an odd output in order of the bits to be output.

When dividing the output of the precoder into the even output and the odd output, the i-th output bit $Y_i$ of the code word and the $Y_{i+1}$ can be computed as follows.

Expression (1): the computation of the even output $$y_i = (x_0 \text{ XOR } s_0 \text{ XOR}, \ldots, \text{ XOR } s_{i-2} \text{ XOR } s_i)$$

Expression (2): the computation of the odd output $$y_{i+1} = (x_1 \text{ XOR } s_1 \text{ XOR}, \ldots, \text{ XOR } s_{i-1} \text{ XOR } s_{i+1})$$

The expression (1) shows that when the i-th input bit is encoded by and output from the 2T precoder 803, the even output value $y_i$ is computed by the XOR operation with respect to the even input bits to $x_0$ and i-th bit.

In addition, the expression (2) shows that when the i-th input bit is encoded by and output from the 2T precoder 803, the odd output value $y_{i+1}$ is computed by the XOR operation with respect to the odd input bits to $x_1$ and (i+1)th bit. Thus, the even bit output value is decided in accordance with the even input bit and the $x_0$ value, and the odd output bit value is decided in accordance with the odd input bit and $x_1$ value.

In the first embodiment, there is a predetermined inverted relationship in the XOR operation between the result value computed by ORing the input of an "n" number of bits in order, and the result value obtained by inverting one bit among the "n" number of bits. However, since the "0" affixing code word of the code word of 25 bits converted into the code word by the 2T precoder 803 and the 1 bit of the top of the "1" affixing code word are inverted, and the remaining bits are the same 24 bits, it is possible to use the characteristic of the XOR operation.

Two register values $x_0$ and $x_1$ may be divided into two cases of $x_0 = y_{23}^{n-1}$, $x_{24}^{n-1}$. Here, one code word is expressed from 0 to 24 bits, of which the even bits are 0, 2, 4, ..., 24, and the odd bits are 1, 3, 5, ..., 23. In addition, $y_{23}^{n-1}$ is referred to as the last 23rd bit value of the (n−1)th code word, and the $X_{24}^{n-1}$ is referred to as the last 24th bit value of the (n−1)th code word.

In the code word including a synchronization according to the above-described computation, the register values $x_0$ and $x_1$ of the precoder are always set at 0. In addition, the last two bits of the n-th code word not including the synchronization are set to the value in the register.

Therefore, it is possible to accurately compute the "1" affixing code word from the "0" affixing code word using the output characteristic. In particular, the characteristic of the XOR operation (a predetermined relationship between the result value obtained by XORing the input of a predetermined "n" number of bits in order, and the result value obtained by inverting one of the "n" number of bits). The code word can be thus computed by dividing the same into even and odd bits.

For example, when the register values $x_0$ and $x_1$ are accurate, the "0" affixing code word can be accurately computed. Further, when the code word includes the synchronization, the even bits and odd bits are all inverted and output. Moreover, when the code word does not include the synchronization, since only the bit $s_0$ at the top is inverted, the even bit value is inverted and output. However, the two register values $x_0$ and $x_1$ within the precoder may be set as accurate values and computed, and may be set to inaccurate values and computed.

In the first embodiment of the present invention, the two register values $x_0$ and $x_1$ are set as accurate values at every 30 code words and include one synchronous pattern.

As to whether the two register values refer to accurate value or not is determined based on the following four situations (see also FIG. 18).

Figures 10, 11:
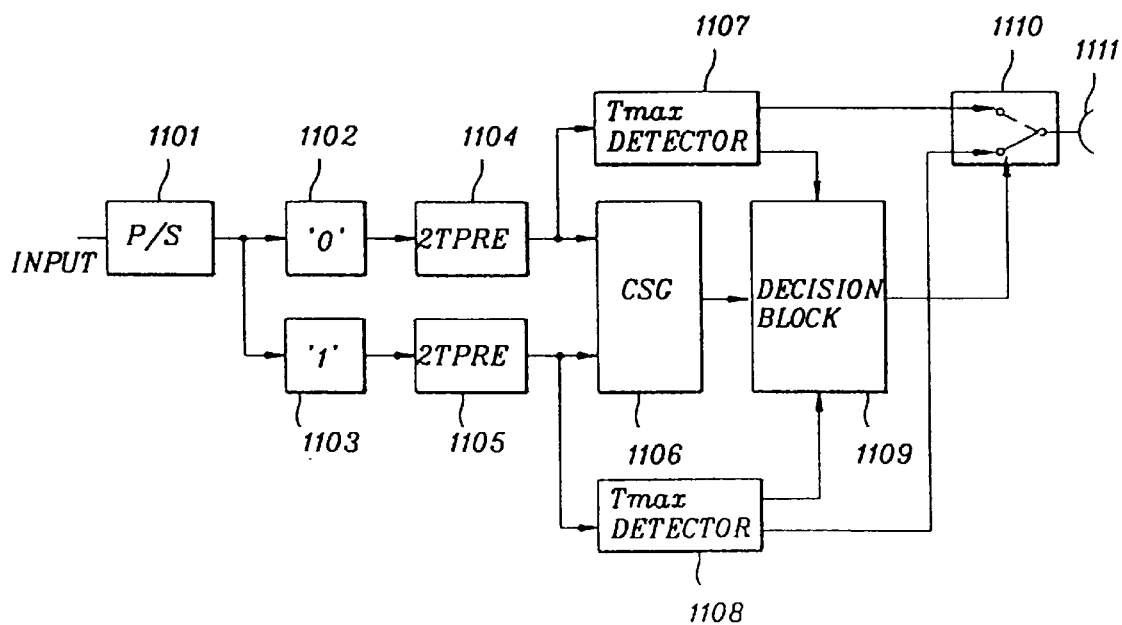
FIG. 10 is a table showing an accuracy judgment of an odd bit and even bit according to a first embodiment of the present invention.
FIG. 11 is a block diagram showing a signal recording apparatus according to a second embodiment of the present invention.

FIG. 10 shows the table which is used for judging the accuracy of the n-th "0" affixing code word, as well as the even and odd output bits of the "1" affixing code word in accordance with the accuracy of two register values stored after the (n−1)th code word is output. As further shown in FIG. 10, $J_{23}^{n-1}$, $J_{24}^{n-1}$ denote variables which are used for the judgement of the accuracy of the odd output bits and the even output bits of the n-th code word, and are decided after the (n−1)th code word is selected. In addition, as shown therein, there are four initial values, which are referred to the values of the "0" affixing code word, since the "0" affixing code word is input as a default by the "0" signal affixing unit 802.

As shown in FIG. 10, R1, R2 denote that the odd bits and even bits which refer to the outputs of the precoder 803 are accurate, and /R1 /R2 denote that the odd bits and even bits output from the precoder 803 is the inverted value. R1, /R2 denote that the odd bits are accurate, and the even bits are inverted, and /R1 R2 denote that the odd bits are inverted, and the even bits are accurate.

In addition, the first column of FIG. 10 shows whether the n-th code word is a sync or non-sync, and whether the "0" affixing code word is processed or not. It also determines whether the "1" affixing code word is processed.

Referring to the table of FIG. 10, accuracy of the odd bits and even bits in case of the synchronous code word will now be explained.

In case the "0" affixing code word is the code word containing the sync, and $J_{23}^{n-1}$, $J_{24}^{n-1}$=R1 R2, the odd bits and even bits of the n-th "0" affixing code word are all accurate.

In case of the "1" affixing code word is the code word including the sync, and $J_{23}^{n-1}$, $J_{24}^{n-1}$=/R1 /R2, the odd output bits and even output bits of the n-th "1" affixing code word are all inverted.

Next, the method for computing the power of the code word to which "0" and "1" are affixed using the "0" affixing code word will now be explained.

When $J_{23}^{n-1}$, $J_{24}^{n-1}$=/R1 /R2, during the power computation of the n-th code word and the computation of the value of $J_{23}^{n-1}$, $J_{24}^{n-1}$ after the control signal is output, the power of the n-th code word is divided into the following two cases and then computed in accordance with whether or not the sync of the (n−1)th code word is present.

Case 1: in case of the code word containing the sync, the odd bits computation value of the "0" affixing code word, and the even bit computation value are accurately computed. In addition, in the "1" affixing code word, the odd bit computation value, and the even bit computation value are all computed at inverted values, namely as the negative value.

When the "0" or "1" affixing code is selected after the power computation, namely, when CS=0(1), $J_{23}^{n-1}$, $J_{24}^{n-1}$= R1 R2 (/R1 /R2), the value of the affixing code is used for judging the accuracy of the odd and even bits of the (n+1)th code word.

Case 2: In this case, the code word does not include the sync. In the "0" affixing code word, the odd bit computation value, and the even bit computation value are accurately computed, and in the "1" affixing code word, the odd bit computation value is accurately computed, and the even bit computation value is inverted.

When the "0" or "1" affixing code word is selected after the power computation, namely, when CS=0(1), $J_{23}^{n-1}$, $J_{24}^{n-1}$=R1 R2 (/R1 /R2), the value of the affixing code is used for judging the accuracy of the odd bits and even bits of the (n+1)th code word.

Till now, as described above, it is possible to easily conduct the detection of the "1" affixing code word from the "0" affixing code word using the signal recording apparatus for a magnetic recording medium of a video instrument. Further, the computation of the power of the "0" affixing code word and the power of the "1" affixing code word can also be used to detect the "1" affixing code word.

With reference to the above description, the recording and coding process of FIG. 8 will now be described in detail.

First, the parallel/serial converter 801 outputs the 24 bits data steam. The signal affixing unit 802 affixes one control bit, which is assumed to be "0" to the data stream. The channel word is thus converted into 25 bits code word by the 2T precoder 803 and then input to the correction/Tmax detector and the control signal generator 804, respectively. The correction/Tmax detector 805 stores the output of the precoder 803, and corrects the stored value as shown in FIG. 10 to the "0" affixing code word and the "1" affixing code word, and detects the bit run length.

Figure 9:
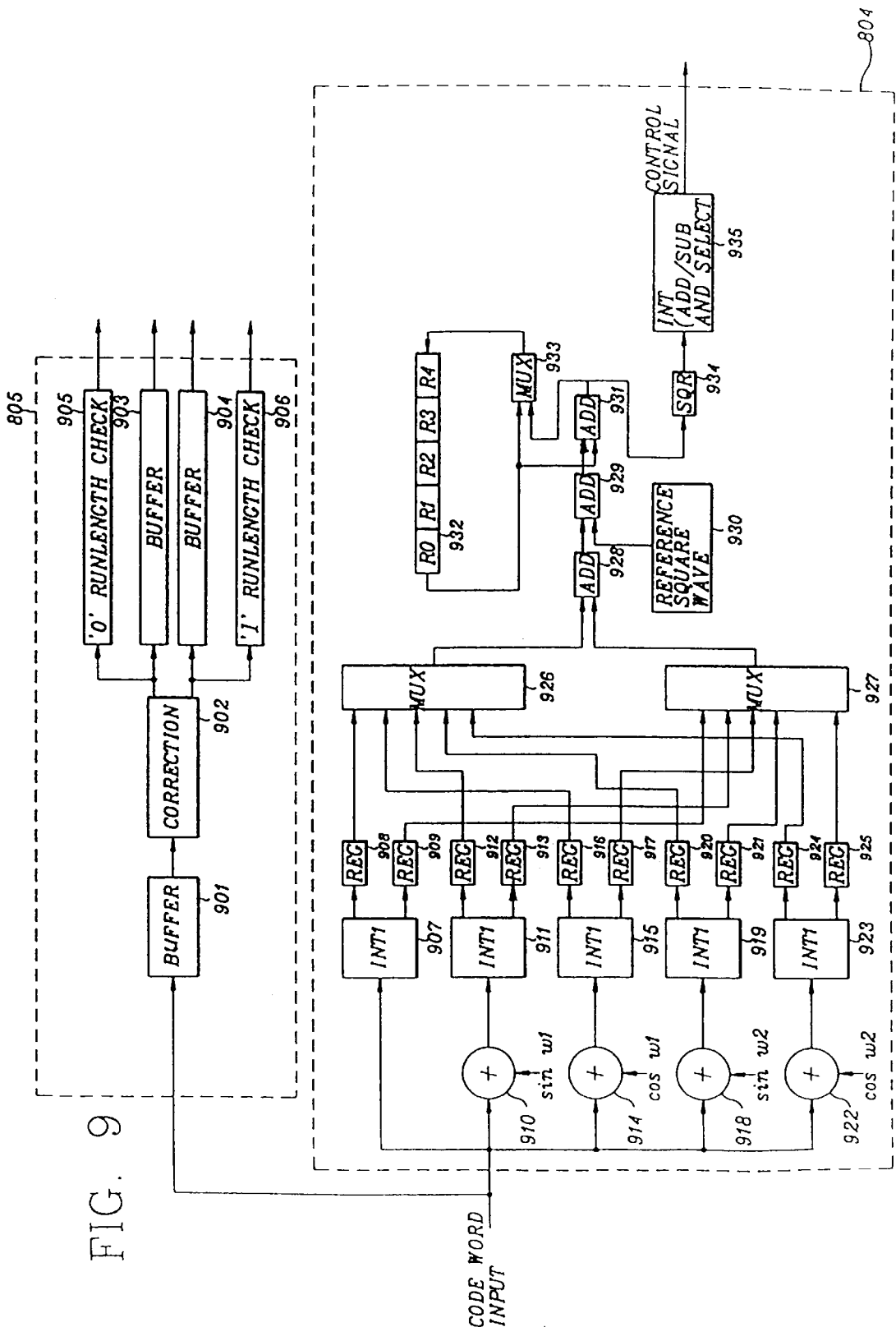
FIG. 9 is a detailed block diagram showing a signal recording apparatus according to a first embodiment of the present invention.

The correction/Tmax detector 805, as shown in FIG. 9, includes a buffer 901 for storing the input code word, and the correction unit 902 for correcting the code word stored in the buffer 901. Buffers 903 and 904 store the code word output from the correction unit 902, and a "0" bit run length detector 905 detects the "0" bit run length of the code word output from the correction unit 902. Further, a "1" bit run length detection unit 906 detects the "1" bit run length of the code word output from the correction unit 902.

The 25 bit code word is output from the 2T precoder 803 and stored in the buffer 902. The stored value is then corrected to the accurate "0" affixing code word and "1" affixing code word by the correction unit 902.

The "0" bit run length detector 905 detects the bit run length of the "1" affixing code word, and inputs the control signal to the recording signal decision unit 806. In addition, the "1" bit run length detector 906 detects the bit run length of the "1" affixing word and inputs the control signal to the recording signal decision unit 806.

Buffers 903 and 904 store the code word output from the correction unit 902 during the detection of the bit run length, and then supply an input to the head/switching unit 807.

As shown in FIG. 8, the control signal generator 804 inputs the control signal to the recording signal decision unit 806 with the code word of 25 bits output from the 2T precoder 803.

FIG. 9 shows the construction of the control signal generator 804, which includes a buffer 901 for storing the input code word and a correction unit 902 for correcting the code word stored in the buffer 901. Buffers 903 and 904 store the output code word of the correction unit 902, and a "0" bit run length detector 905 detects the "0" bit run length of the output code word of the correction unit 902. In addition, a "1" bit run length detector 906 detects the "1" bit run length of the output code word of the correction unit 902, and an integrating unit 907 integrates the input code word. A register 908 is provided for storing the output of the integrating unit 907, and a multiplier 910 multiplies the input code word by the sine wave signal sin w1. Further, an integrating unit 911 integrates the output of the multiplier 911.

Registers 912 and 913 store the output of the integrating unit 911, while multiplier 914 multiplies the input code word by the cosine wave signal. An integrating unit 915 integrates the output of the multiplier 914, and registers 916 and 917 store the output of integrating unit 915.

Multiplier 918 multiplies the input code word by sine wave signal sin w2, and integrating unit 919 integrates the output of the multiplier 918. Registers 920 and 921 store the output of integrating unit 919, and multiplier 922 multiplies the input code word by the cosine wave signal cos w2. Integrating unit 923 is provided for integrating the output of the multiplier 922, and registers 926 and 927 store the output of integrating unit 923.

Multiplexors 926 and 927 multiplex the output of the registers, and adder 928 adds the output of the multiplexors. Further, adder 929 adds the output of the reference square wave from square wave generator 930 to the output of the adder 928, and adder 931 adds the output of the register 932 to the output of adder 929. Multiplexor 933 multiplexes the outputs of the adder 931 and register 932 and supplies an input to register 932. Squaring unit 934 squares the output of adder 931, and a comparison judgement unit 935 receives the output of the squaring unit 934 and outputs the control signal in response thereto. The code word is then encoded by the 2T precoder 803 is input to the integrating unit 907 and the multipliers 910, 914, 918, and 922.

The odd and even bits are, in turn, supplied to the integrating unit 907, 911, 915, 919, and 923. Specifically, the code word of 25 bits is divided into 13 odd bits and 12 even bits and is then integrated. The results of the integrating are respectively stored in ten registers 908, 909, 912, 913, 916, 917, 920, 921, 924, and 925 at every 25 bits.

Meanwhile, multiplier 910 multiplies the sine value sin w1 of the table by the input code word. The product is then integrated by the integrating unit 911. Further, multiplier 914 multiplies the cosine value cos w1 of the table by the input code word, and the product is integrated by the integrating unit 915. Multiplier 918 multiplies the sine value sin w2 of the table by the input code word, and the product is integrated by the integrating unit 919. Multiplier 922 multiplies the cosine value cos w2 of the table by the input code word, the product is then integrated by the integrating unit 923.

Therefore, by previously preparing the table with respect to the sine signal and cosine signal for the integration, it is possible to reduce the computation time.

The input code word is integrated by the integrating unit 907, and is stored in the registers 908 and 909.

The multiplexor 926 selects the even bit integration value stored in the registers 908, 912, 916, 920, and 924, and the multiplexor 927 selects the odd bit integration value stored in the registers 909, 913, 917, 921, and 925. The integration value selected by the multiplexors 926 and 927 is added by the adder 928, and the integration value of the odd 12 bits and the integration value of the even 13 bits are summed, and, thus, the sum value of 25 bits is obtained.

When the adder 928 adds the even and odd bits, the even and odd bits of the "0" affixing code word and "1" affixing code word are added using the accurate judging signal of the even and odd bits. The sum output of adder 928 is input to the adder 929, which adds the output value of the reference square wave generator 930 and the output value of the adder 928. At this time, the square wave signal is previously computed to the sine function, the cosine function, and the unit of 25 bits. It is then stored in the generator 930 as the reference square wave table.

Therefore, the power of the "0" affixing code word and the "1" affixing code word stored in the reference square wave generator 930 are computed and summed. When the power is computed again with respect to the selected code word, they are summed again.

In the adder 931, the power values R0–R4 with respect to five lines, which is integrated over up to (and including) the last code word and stored in the register 932, and the integration value (i.e., the output of the adder 929) of 25 bits of the code word, to which "0" and "1" are affixed, are added.

Multiplexor 933 selects the output of the register R0 and then supplies it to register R4, and thereby enables the five register values to be shifted in accordance with the clock, so that the value of the register 932 does not vary.

Meanwhile, the value integrated by the adder 931 is squared by the squaring unit 934. In addition, the output of the squaring unit 934 is input to the comparison/judging unit 935, and the comparison/judging unit 935 is added five times when computing the power of the "0" affixing code word. It is also added five times when computing the power of the "1" affixing code word. The size is judged using the subtracted or added result value. The resultant judged signal is input to the recording signal decision unit 806 as the control signal CS.

The generation of the control signal CS by the control signal generator 804 is achieved in the above-described method.

Referring to FIG. 8, the recording signal decision unit 806 decides which signal is recorded using the Tmax detection signal input from the correction/Tmax detector 805 and the control signal CS input from the control signal generator 804. Circuit 806 supplies the control signal to the head/switching unit 807. At this time, the detection result of the bit run length of the correction/Tmax detector 805 has priority rather than the power computation result of the control signal generator 804. Accordingly, the recording signal decision unit 806 outputs a selection signal of the last code word, and the head/switching unit 807 selects one code word of either the output of the buffer 903 of the correction/Tmax detector 805 or the output of the buffer 904 in accordance with the selection signal. The code word is then recorded on the magnetic tape 808.

Thus, either the "0" affixing code word or the "1" affixing code word is selected in accordance with the selection signal of the code word. In addition, the power value of the selected code word of FIG. 9 is added to the power value which is integrated up to just before the code word, and stored in the five registers 932 through the multiplexor 933. Accordingly, the size of the circuit is reduced due to sharing by the sharable circuit.

Further, the value stored in the register 932 is used in computing the code word which is input next.

In the first embodiment of the present invention, it is assumed that the "0" affixing code word is always affixed. Accordingly, after the output signal to which the pilot tone is affixed is computed, when affixing "1", the output signal is corrected. In addition, the signal to be recorded on the tape is accurately computed in order for a proper code word to be recorded on the tape. Thus, it is possible to process the recording data in real time. Moreover, the circuit elements are shared, thus simplifying the construction of the video system.

FIG. 11 shows the signal recording apparatus for a video instrument using a magnetic recording medium according to the second embodiment of the present invention.

This embodiment is directed to using the regularity of the output data of the 2T precoder so as to resolve delay time problems and obtain the same effect as using four line blocks, block 1–block 4.

Here, the line blocks includes a first line block, block1, in which the channel word of (24+1) bits to which "0" is first affixed. Next, 2T preceding is performed followed by multiplication of the sine wave/cosine wave. The integration is then performed followed by the squaring operation. In the second line block, block2, the channel word of the (24+1) bits to which "1" is affixed is first converted, and then 2T preceding is performed. Next, multiplication of the sine/cosine wave signal is performed followed by integration. Lastly, the squaring operation is performed. The third line block, block3, conversion of the channel word of (24+1) bits to which "0" is affixed so as to process the data in real time. Next, 2T preceding is performed followed by the multiplication of the sine/cosine wave signal. The integration is then performed followed by the squaring operation. In a fourth line block, block4, the channel word of (24+1) bit to which "1" is affixed is first converted, followed by the 2T preceding. Next, the multiplication of the sine/cosine wave signal is performed followed successively by the integration and squaring operations.

In accordance with the second embodiment of the invention, a parallel/serial converter 1101 is provided for converting the 8 bits of parallel input data into the serial data stream of 24 bits. A signal affixing unit 1102 receives the output of the parallel/serial converter 1101 and affixes the "0" one bit to the data streams. A signal affixing unit 1103 receives the output of the parallel/serial affixing unit 1101 and affixes the "1" one bit. Next, a 2T precoder 1104 receives the output of the signal affixing unit 1102 and generates the code word of 25 bits. A 2T precoder 1105 receives the output of the signal affixing unit 1103 and generates the code word of 25 bits. A control signal generator 1106 receives the output of the precoders 1104 and 1105, and corrects the corresponding code word value to the correct value when the "0" affixing assumption is incorrect using the characteristic table of the regular bit data. A control signal is thus generated to select among two bit streams, the bit stream which is nearest the frequency characteristic of the track to be recorded.

A correction/Tmax detector 1107 detects the upper limit value (for example, 10) of the bit run length of the signal affixing unit 1104, and supplies the signal to the control signal generator 306, as well as correct the input code word value. Correction/Tmax detector 1108, on the other hand, detects the upper limit value of the bit run length of the signal affixing unit 1105, supplies the signal to the control signal generator 306, and corrects the input code word value.

A recording signal decision unit 1109 receives the output of the control signal generator 1106 and the output of the correction/Tmax detectors 1107 and 1108 and selectively controls the code word in response thereto. Head switching unit 1110 receives the control output of the recording signal decision unit 1109, and selects either the code word of the correction/Tmax detector 1107 or the code word of the correction/Tmax detector 1108. The result is recorded on magnetic tape 1111.

The operation of the signal recording unit of the present invention will now be explained.

First, the parallel/serial converter 1101 converts the parallel digital data of 8 input bits into the 24 bits of serial digital data. The "0" signal affixing unit 1102 affixes the "0" of one bit to the 24 input bits of data, and thus forms a channel word of 25 bits, and the "1" signal affixing unit 1103 affixes the "1" of one bit to the 24 input bits of data, and forms a channel word of 25 bits. The 25 bit channel word is output from the "0" signal affixing unit 1102 and supplied to the 2T precoder 1104, where it is converted into a first code word. The 25 bit channel word is also output from the "1" signal affixing unit 1103 and supplied to the 2T precoder 1105 and is converted into a second code word.

The first and second code words respectively output from the 2T precoders 1104 and 1105 are input to the control signal generator 1106, and to the correction/Tmax detectors 1107 and 1108, as well. The control signal generator 1106 computes the power of the code word on the assumption that the "0" is always affixed to the input code word, and generates a control signal so that the bit stream near the frequency characteristic of the track on which the information is recorded can be selected. The control signal is then input to the recording signal decision unit 1109.

The correction/Tmax detectors 1107 and 1108 store the input code word, perform the code word correction, and detect the upper limit value of the bit run length. A signal corresponding to the upper limit value of the bit run length is input to the recording signal decision unit 1109, and the corrected code word is input to the head/switching unit 1110.

The recording signal decision unit 1109 receives the output of the control signal generator 1106 and the output of the correction/Tmax detectors 1107 and 1108, and controls the head/switching unit 1110 to select the code word. Accordingly, the appropriate digital information for the frequency characteristic of the recording track is recorded on the magnetic tape 1111.

Figure 12:
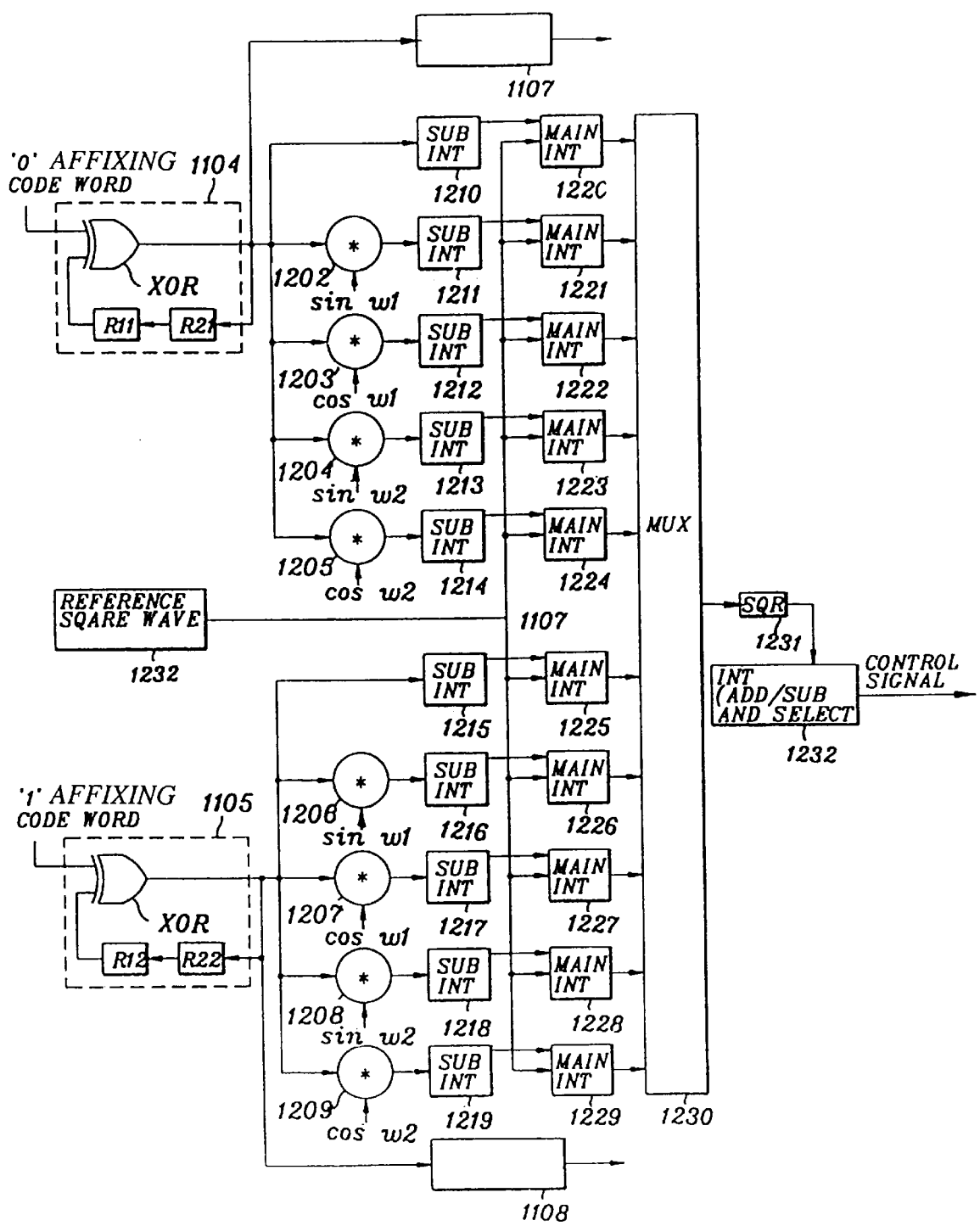
FIG. 12 is a diagram showing a signal recording apparatus according to a second embodiment of the present invention.

FIG. 12 shows the inner construction of the control signal generator and the correction/Tmax detector including the 2T precoder according to the second embodiment of the present invention.

In accordance with the second embodiment, pilot tone generation circuit as a signal recording apparatus shown in FIGS. 10 and 11 has the following characteristics.

The pilot tone is generated and the digital information is recorded using the regular characteristic of the bit data output through the precoder. These regular characteristics are related to reducing the number of blocks necessary for processing the data at a real time from four to two.

As a regular characteristic of the bit data output through the precoder, when the values of the registers R11, R21, R12, R22 of the precoders 1104 and 1105 of FIG. 12 are different from the values of R11 XOR In(n,1) and R11 XOR In1(n,1) before the input of the new channel word, the output of the (2n+1)th output of the code word output from different blocks is always reversed. Further, when the values of R21 and R22 are different from each other, then the n-th output of the code word output from two blocks is also different.

In addition, the second embodiment of the present invention is directed to using the reference square wave table and sharing the squaring unit block, so that it is possible to form the signal recording unit with less hardware, thereby occupying less space.

In particular, the number of squaring blocks is reduced from 20 to one as compared to the four line blocks. In addition, since the sub-integrating unit is provided at the pre-portion of the main integrating unit, it is possible to resolve the speed problems when processing the input bit in real time.

The pilot tone generation operation of the present invention having the above-mentioned characteristic will now be explained with reference to FIG. 12.

First, the construction of the control signal generator, as shown in FIG. 12, includes a reference square wave generator 1201 including information in a table for the computation of the reference square wave. Multipliers 1202-1205 multiply the sine wave signals and the cosine wave signals (i.e., sin w1, cos w1, sin w2, cos w2), which signals are in the table in the code word of the 2T precoder 1104. Sub-integration units 1210-1214 receive the output of the 2T precoder 1104 and the outputs of the multipliers 1202–1205 and integrate the input bit, which may be incorrectly computed before the accurate selection signal is output from the last output. Main-integrating units 1220–1224 receive the output of the sub-integrating units 1210–1214 and process the values of the reference square wave generator 1201 separately from the input data integration value, which is done when correcting the incorrect computation value which is made by the sub-integrating unit.

Multipliers 1206–1209 multiply sine signals and cosine signals (sin w1, cos w1, sin w2, cos w2) which are provided in the table of the code word of the 2T precoder 1105. Sub-integrating units 1215–1219 receive the output of the 2T precoder 1105 and the output of the multipliers 1206–1209 and integrate the input bit, which may be incorrectly computed before the accurate selection signal occurs from the signal output. Main integrating units 1225–1229 receive the outputs of the sub-integrating units 1215–1219 and process the value of the reference square wave generator 1201 separately from the input data integration value when correcting the value of the reference square wave generator 1201.

A multiplexor 1230 multiplexes the output of the main integration units 1220–1229, and a squaring unit 1231 squares the output of the multiplexor 1230. Comparison judging unit 1232 receives the output of the squaring unit 1231, and computes the power in accordance with the addition or subtraction and the "0" affixing code word and the "1" affixing code word.

The pilot tone generation circuit according to the present invention is directed to computing two cases on the assumption that the control bit is referred to just before code word instead of u sing the four line clocks.

Namely, when the "0" bit is selected as the control bit of the code word which is referred to just before code word, it is possible to accurately compute at two blocks.

When the assumption is wrong, that is, when the "1" affixing code word is selected, the value is corrected to be more accurate instead of computing the register value of the pre-coder. The register value connection table, such as that shown in FIG. 14, is used. For example, FIG. 14 shows the modification table which is used for the computation value when the "1" affixing bit is selected as the control bit just before the code word in order to illustrate how two register values in the precoder can be corrected.

In FIG. 14, a, b, c, d, e, f, {0, 1}, <->denote the inverted bit stream. $Bi=R_{1i} R_{2i}$ denotes the register value of i-th line block among four blocks block1, block2, block3, and block4, and the values outside the brackets denotes the block1(block1). The block2(block), and the values inside the brackets denote the block 3(block3), and the block4 (block4).

The blocks are summed by the 2T precoders 1104 and 1105 and the control signal generator for computing the output value of the precoder. In addition, blocks 1 and 2(the clock 3 and 4) are computed on the assumption that the just before code word are affixed with "0" ("1").

The code words are divided into the following three cases.
Case 1: the code word including the syn, case 2: the next code word including the sync code word, and case 3: the other code word.

Since only two code words are used in the present invention, when $B_3$ $B_4$ are necessary, B, $B_2$ should be computed first.

As shown in table 14, due to the delay time of the circuit, it does not need to correct the value of the register.

Therefore, the cases that the correction should be made are referred to in cases 2 and 3.
Case 2: $B_3 < (R_{11} R_{12})$, $B_4 <- (R_{12} R_{22})$
Case 3: $B_3 < (R_{12} R_{22})$, $B_4 <- (R_{11} R_{21})$ Namely, the values of the $B_3$, $B_4$ of case 2 are obtained by inverting the values of $B_1$, $B_2$, and the values of the $B_3$, $B_4$ of case 3 are ob1theained by inverting the values of $B_2$, $B_1$.

The operation of each element of the pilot tone generator will now be explained with reference to FIG. 12. The 2T precoders 1104 and 1105 process the data of 25 bits serially one bit at a time to output as the code word. The values of the two registers (R11, R12) and (R12, R22) are set, before the first bit of the input data is input.

Except for the input of the code word including the sync, the values of the two registers are decided in accordance with the control signal output from the control signal generator of the pilot tone generator.

Before the first bit of the code word is input, the previous control signal CS should be output in order to properly set the value of the register. However since it is not implemented due to the delay time within the control block, the values of the two registers within the block which has the default are set as the value of the register of the 2T precoder.

A method for correcting the two register values within the 2T precoder can be divided into the following cases: a first code word case including the sync signal, a second code word case, and the other code word case. Here, the correction method is based on the regular characteristic of the method of FIG. 14 and the data stream.

In the event that the first code word includes the sync signal, since the values of the two registers (R11, R21), (R12, R22) should be correctly set and output, it is unnecessary to correct the value. Further, in regard to the second code word, the values of the registers (R11, R21) and (R12, R22) should all be inverted.

In addition, with respect to the other code words, when explaining the characteristic of the 2T precoder, and the code words, except for when first and second cases are output, the output values of the first and fourth blocks block1 and block4 are always reversed, and the output values of the second and third blocks, block2 and block3, respectively, are always reversed.

The first and fourth registers and the second and third registers are continuously reversed.

Therefore, in order for the result value of the first line block to be the same as the third block, the register value of the second block should be inverted and then stored in the first block. Further, in order for the result value of the second block to be the same as the value of the fourth block, the register value of the first block should be inverted, and then stored in the second block.

At the same time, multipliers 1202–1209 multiply the sine wave signal, the cosine wave signal (sin w1, cos w1, sin w2, cos w2) supplied from the previously set sine, and cosine tables, respectively, by the code words output from the precoder. The products are then input into the sub-integrating units 1211–1214, 1216–1219.

The sub-integrating units 1210–1219 are newly added so as to resolve the speed problems when processing the input bit in real time. Specifically, the sub-integrating units 1210–1219 repeat two separate integrating processes for the time required to process the 25 bits of data.

Namely, one process is referred to the integrating process for multiplying the cosine value by the sine value with respect to 17 bits of the code word "n", which is not corrected in accordance with the control signal generated by the code word "n–1". In addition, another process is referred to the integration process for multiplying the cosine value by the sine value of the remaining 8 bits of the code word "n". Further, the values of the sub-integrating units 1210-1219 are initialized once at every 17 bits and 25 bits and the become "0", and whenever the same are initialized, the values are input into the main integrating units 1220–1229.

When computing the code word "n", since the values integrated during 17 bits are referred to the input data, the result may be wrong. Accordingly, as is described in the method of FIG. 14, the wrong integration value should be corrected to the correct integration value by using the output characteristic of the 2T precoders 1104 and 1105. The values obtained by integrating the next 8 bits, however, are correct since the pattern selected among two patterns of the code word (n–1) is known.

The method for correcting the values integrated by the sub-integrating units 1210–1219 will now be described follows. When the first code word including the sync signal is involved, connection is not necessary. In the case of the second code word, however, when the values stored in the sub-integrating units 1210–1219 are output to the main-integrating units 1220–1229, a (–) is added to the values of the sub-integrating units 1210–1219, and then the values are added by the main-integrating units 1220–1229.

These steps are performed because the 2T precoder outputs of the first (second) block and third (fourth) blocks are always reversed. Accordingly, in order to obtain the same result as the third (fourth) block with the first (second) block, the values of the sub-integrating units 1210–1219 of the same line blocks are subtracted from the values of the main integrating units 1220–1229.

With respect to the other code words, the value of the sub-integrating unit of the first line block is passed to the integrating unit of the second block, and the value of the sub-integrating unit of the second line block is passed to the first line block. At this time, the value passed thereto from the sub-integrating unit is subtracted from the values of itself.

Similarly, the values integrated by the sub-integrating unit (17 bits or 8 bits) are input for each code word and are repeatedly integrated by the main integrating units 1220–1229.

In the reference square wave generator 1210, the sine and cosine values are multiplied by the quotient of the 25 bits, and then all values which are integrated are included in the contents of the table. These values are then provided to the main integrating units 1220–1229 in 25 clock cycles. Accordingly, the reference square wave information is directly input into the main integrating units 1220–1229 once every 25 clocks and then integrated.

At this time, since the time for integrating using the main integrating units 1220–1229 can always be available during the processing of the 25 bits, there is a substantial amount of time available to read the values of the table.

The values integrated by the main integrating units 1220–1229 are input into the squaring unit 1231 through the multiplexor 1230 and then squared, and then input to the comparison judgement unit 1232.

The comparison judgment unit 1232 receives the output of the squaring unit 1231, computes the power through the addition operation or the subtraction operation in accordance with the "0" affixing code word and the "1" affixing code word. The size is then judged using the result value, and then a control signal CS is output. Control signal CS is next input to the recording signal decision unit in order to select one code word among two possible code words.

Figure 13:
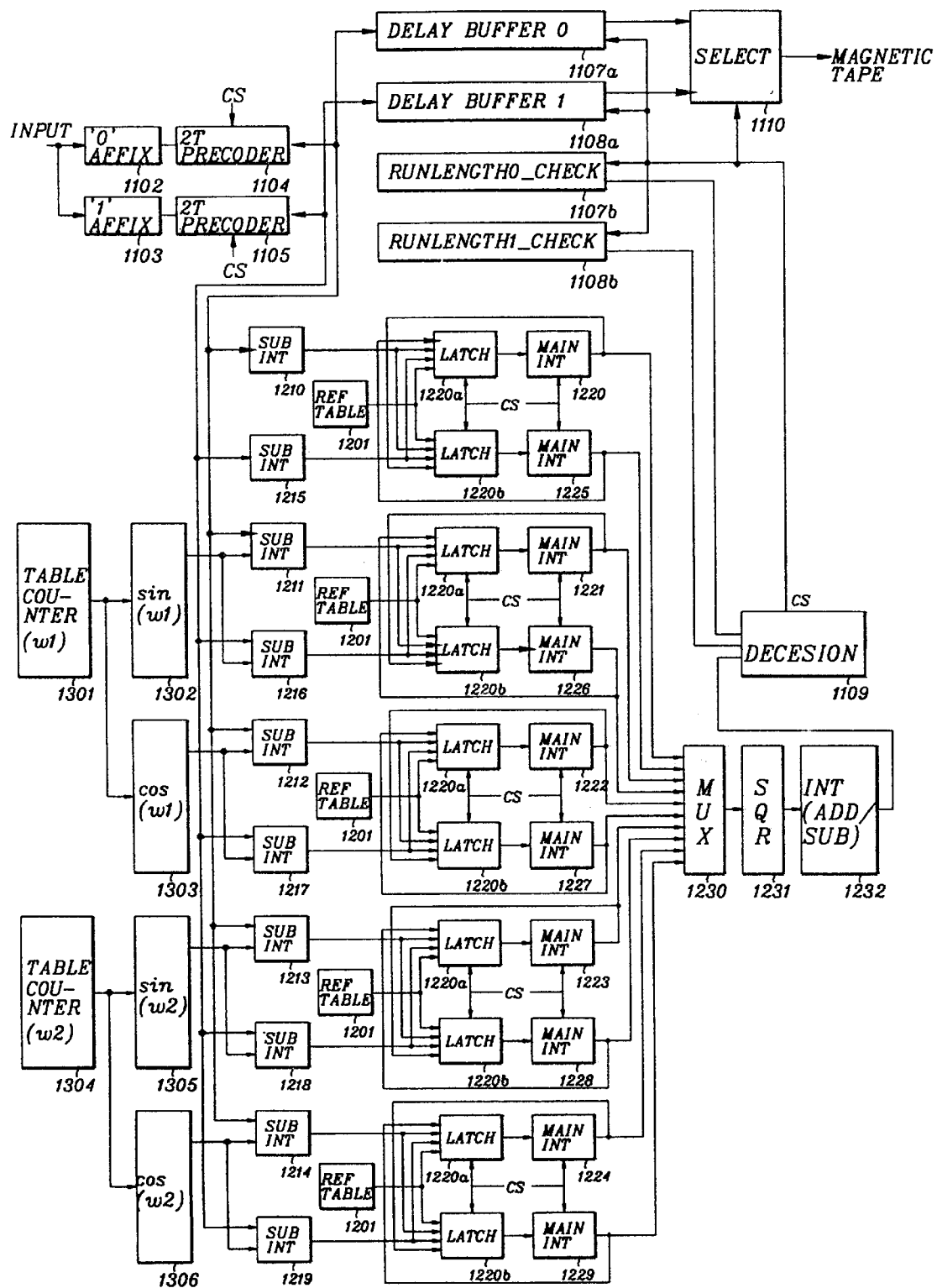
FIG. 13 is a detailed diagram or a signal recording apparatus according to a second embodiment of the present invention.

FIG. 13 shows the entire construction of the pilot tone generation circuit of FIG. 12.

Many of the elements shown in FIG. 13 are the same as the elements of FIG. 12, and are labeled with the same reference characters.

This embodiment includes sine wave tables 1302 and 1305, cosine tables 1303 and 1306 which are previously set, and table counters 1301 and 1304 for reading each wave information. In addition, latches 1220–1229 are further provided for temporally storing the data input from the sub-integrating units 1210–1219 to the main integrating units 1220–1229. Further, the reference square wave information is provided from the reference square wave generator 1201.

In addition, the correction/Tmax detectors 1107 and 1108 include a delay buffer 1107a for storing the "0" affixing code word, a "0" bit run length detector 1107a for detecting the "0" bit run length of the "0" affixing code word, a delay buffer 1108a for storing the "1" affixing code word, and a "1" bit run length detector 1108b for detecting the "1" bit run length of the "1" affixing code word.

The bit run length detectors 1107a and 1108b detect the upper limits of the "0" and "1" bit run length of the input code word and input a control signal to the recording signal decision unit 1109. Delay buffers 1107a and 1108a store the output buffer of the 2T precoders 1104 and 1105, and can store the full capacity of the buffer, which is at least one code word. The code word is stored in the time required to process the control blocks. Further, bit values stored in the delay buffers 1107a and 1108a are corrected by the control signal CS.

It is difficult to judge as to whether 17 bits are correct among 25 bits of the code word "n" before the code word (n−1) is judged and the register values of the 2T precoders 1104 and 1105 are corrected in accordance with the control signal. However, when the control signal CS is generated in accordance with the code word (n−1), it is possible to judge as to whether the currently input code word is correct or not. At this time, the input code word value is corrected.

The correction of the bit value of the delay buffer is the same as the method associated with the register value of the 2T precoder.

The recording signal decision unit 1109 receives the output of the control signal generation unit and the comparison judgement unit 1232 and the output of the bit run length detectors 1107b and 1108b. Unit 1109 also controls the head/switching unit 1110, so that one of the output code words of the delay buffer 1107a or the delay buffer 1108a, and records on the magnetic tape.

As described above, the signal recording apparatus for a video instrument using a magnetic recording medium according to the present invention is directed to simplifying the pilot tone generation system by computing the output signal to which the pilot tone is affixed. The output signal is corrected when affixing "1", and the signal to be recorded on the tape is accurately computed assuming that "0" is always affixed to the code word.

In addition, the present invention is directed to reducing the number of blocks from four to two or one and sharing the maximum number of circuits, thus simplifying the construction of the circuit and processing the data in real time.

Moreover, the present invention performs the computation of the reference square wave signal and the sine and cosine signals using a look-up table, thus reducing time for computing these parameters. Therefore, construction of the system is simplified, and the data can be recorded in real time.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A device for generating a digital tracking signal having a frequency spectrum corresponding to one or more n-bit information words, comprising:

means for affixing a fixed 1-bit value to each of said n-bit information words to generate (n+1)-bit channel words;

an aT precoder, "a" being an integer value greater than or equal to two and "T" being the bit period associated with said (n+1)-bit channel word, for encoding a respective one of said (n+1)-bit channel words to generate an (n+1)-bit code word, whereby even and odd bits of code words affixing "0" are inverted to even and odd bits of the code words affixing "1" in the synchronous words, odd bits of code words affixing "0" are identical with the odd bits of the code words affixing "1" in the non-synchronous words;

a control signal generator, coupled to said aT precoder, for determining whether the frequency spectrum associated with said (n+1)-bit code word has a desired pattern to generate a control signal, and for outputting a control signal which modifies an affixing value if the frequency spectrum is not the desired pattern based on the result of the determination; and a correction device, coupled to said to aT precoder, for modifying said (n+1)-bit code word to generate a tracking signal having a desired frequency spectrum in response to said Control Signal.

2. The device of claim 1, wherein said correction device includes a counter for counting the number of either "0" bits or "1" bits in consecutive sequence in said (n+1)-bit code word.

3. The device of claim 2, wherein said counter includes means to determine whether the number of said "0" bits or "1" bits in consecutive sequence of the code word exceeds a predetermined number.

4. The device of claim 1, further comprising means, coupled to said correction device, for recording said tracking signal on a recording medium.

5. The device of claim 4, wherein said correction device includes a counter for counting the number of either "0" bits or "1" bits in consecutive sequence in said (n+1)-bit code word and determines whether the counted number exceeds a predetermined number; and wherein said recording means is coupled to said counter and includes a means for selectively recording said tracking signal based on the result of said determination.

6. The device of claim 1, further comprising a parallel/serial data converter, coupled to said affixing means, for converting an n-bit parallel information word to an n-bit serial information word.

7. The device of claim 1, wherein said fixed 1-bit value is "0" or "1".

8. The device of claim 1, wherein said aT precoder includes:

a gate circuit for XORing the (n+1)-bit channel words; and at least two registers for storing the output of the gate circuit.

9. The device of claim 1, wherein said control signal generator divides said (n+1)-bit code word into a group of odd bits and a group of even bits, and integrates each of said group of odd bits and said group of even bits separately to determine the power of said (n+1)-bit code word.

10. The device of claim 1, wherein said correction device includes an accuracy judgment table having information associated with a regular characteristics of said (n+1)-bit code word for use in modifying said (n+1)-bit code word.

11. A method for generating a digital tracking signal having a frequency spectrum corresponding to one or more n-bit information words, comprising:

affixing a fixed 1-bit value to each of said n-bit information words to generate (n+1)-bit channel words;

encoding a respective one of said (n+1)-bit channel words to generate an (n+1)-bit code word;

determining whether the frequency spectrum associated with said (n+1)-bit code word has a desired pattern to generate a control signal base on the result of determination, whereby even and odd bits of code words affixing "0" are inverted to even and odd bits of the code words affixing "1" in the synchronous words, even bits of code words affixing "0" are inverted to even bits of the code words affixing "1" and odd bits of code words affixing "0" are identical with the odd bits of the code words affixing "1" in the non synchronous words; and modifying said (n+1)-bit code word to generate a tracking signal having a desired frequency spectrum pattern in response to said control signal.

12. The method of claim 11, wherein said modifying step includes counting the number of either "0" and bits or "1" bits in consecutive sequence in said (n+m)-bit code word.

13. The method of claim 12, wherein said counting step includes determining whether said counted number of either "0" bits or "1" bits in consecutive sequence of the code word exceeds a predetermined number.

14. The method of claim 11, further comprising recording said tracking signal on a recording medium.

15. The method of claim 14, wherein said correcting step includes counting the number of either "0" or "1" bits in consecutive in said (n+1)-bit code word and determining whether the counted number exceeds a predetermined number; and wherein said recording step includes selectively recording said tracking signal based on the result of said determination.

16. The method of claim 11, further comprising the step of converting an n-bit parallel information word to an n-bit serial information word.

17. The method of claim 11, wherein said fixed 1-bit value is "0" or "1".

18. The method of claim 11, wherein said encoding step includes XORing the (n+1)-bit channel words; and storing the result of the XORing in a register.

19. The method of claim 11, wherein said determining step includes dividing said (n+1)-bit code word into a group of odd bits and a group of even bits, and integrating each of said group of odd bits and said group of even bits separately to determine the power of said (n+1)-bit code word.

20. The method of claim 11, wherein said modifying step includes providing an accuracy judgment table having information associated with a regular characteristics of said (n+1)-bit code word for use in modifying said (n+1)-bit code word.

* * * * *